United States Patent [19]
Humphrey

[11] 3,927,933
[45] Dec. 23, 1975

[54] APPARATUS FOR OPTHALMOLOGICAL PRESCRIPTION READOUT

[75] Inventor: William E. Humphrey, Oakland, Calif.

[73] Assignee: Humphrey Instruments, Inc., Berkeley, Calif.

[22] Filed: June 26, 1974

[21] Appl. No.: 483,171

Related U.S. Application Data

[63] Continuation of Ser. No. 385,784, Aug. 6, 1973, abandoned.

[52] U.S. Cl. .................... 351/17; 350/181; 351/39
[51] Int. Cl.² .................... A61B 3/10; G02B 13/08
[58] Field of Search ............... 351/17, 39; 350/181

[56] References Cited
UNITED STATES PATENTS

| | | | |
|---|---|---|---|
| 3,015,988 | 1/1962 | Hemstreet | 350/181 |
| 3,428,398 | 2/1969 | Gottschalk | 350/181 X |
| 3,507,565 | 4/1970 | Alvarez et al. | 351/17 |

Primary Examiner—Paul A. Sacher
Attorney, Agent, or Firm—Townsend and Townsend

[57] ABSTRACT

An eye testing device having variable spherical and cylindrical optics inputs along a light path from an image is provided with apparatus for digital readout of sphere power and astigmatic power and angle to provide a complete eyeglass prescription. A first electrical analog of astigmatic lens power is determined and varied responsive to patient objective or subjective visual acuity through first astigmatic optics along substantially perpendicular first and second axes normal to the light path. A second electrical analog of astigmatic lens power is measured through second astigmatic optics along third and fourth axes normal to the light path, these axes being positioned relative to said first and second axes so that first imaginary planes taken through said first and second axes including said view path do not coincide with second imaginary planes taken through said third and fourth axes including said view path. This second electrical analog of astigmatism is determined and varied responsive to patient objective or subjective visual acuity through the second astigmatic optics. Analog or digital computer apparatus resolves the two electrical analog inputs on the basis of a Cartesian coordinate plot having first and second axes.

15 Claims, 12 Drawing Figures

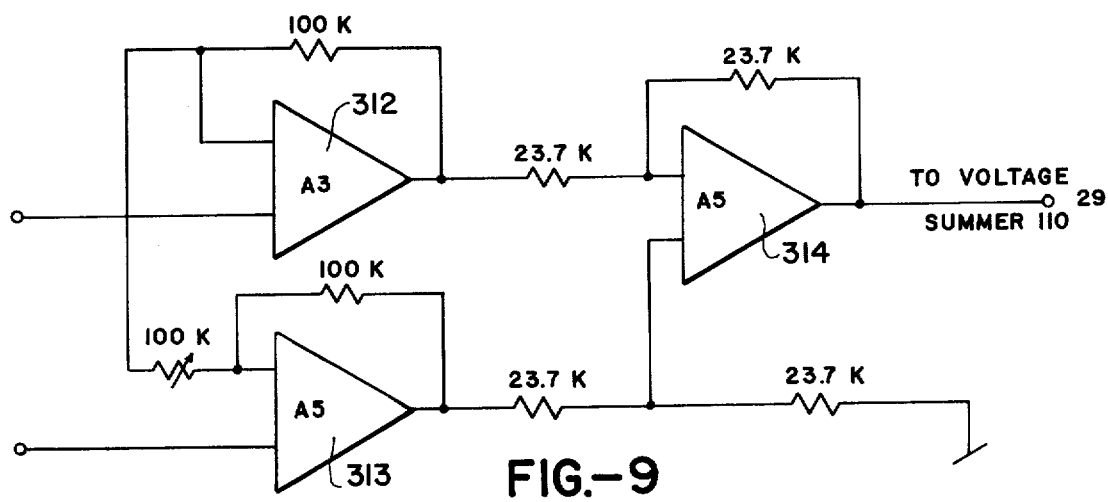
FIG.-9
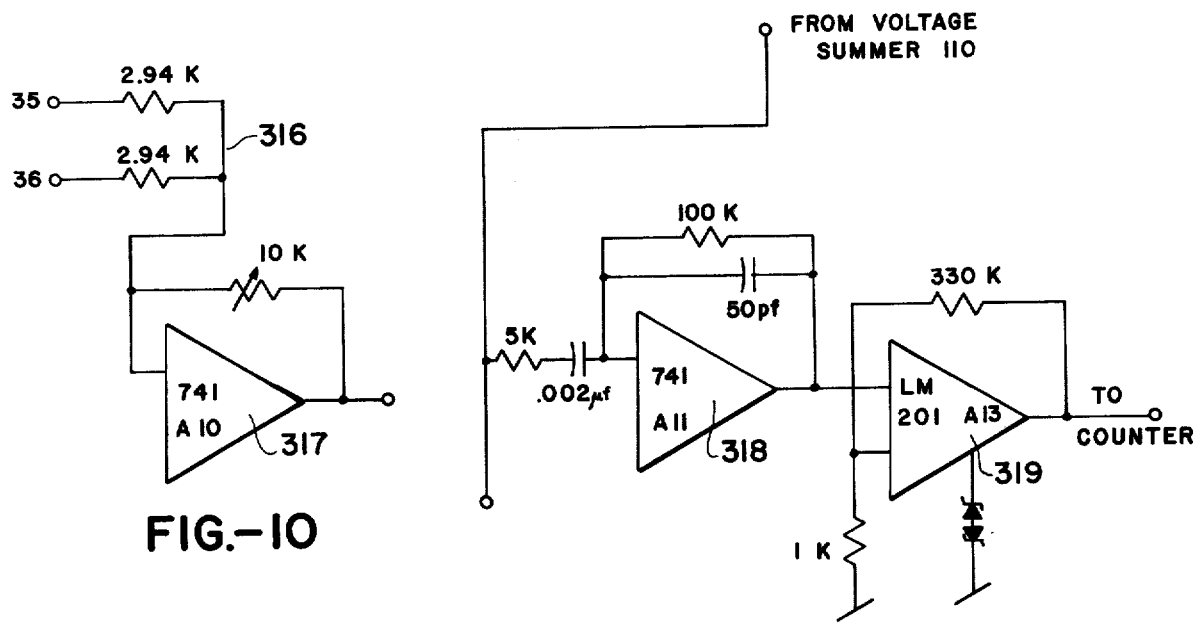
FIG.-10
FIG.-11
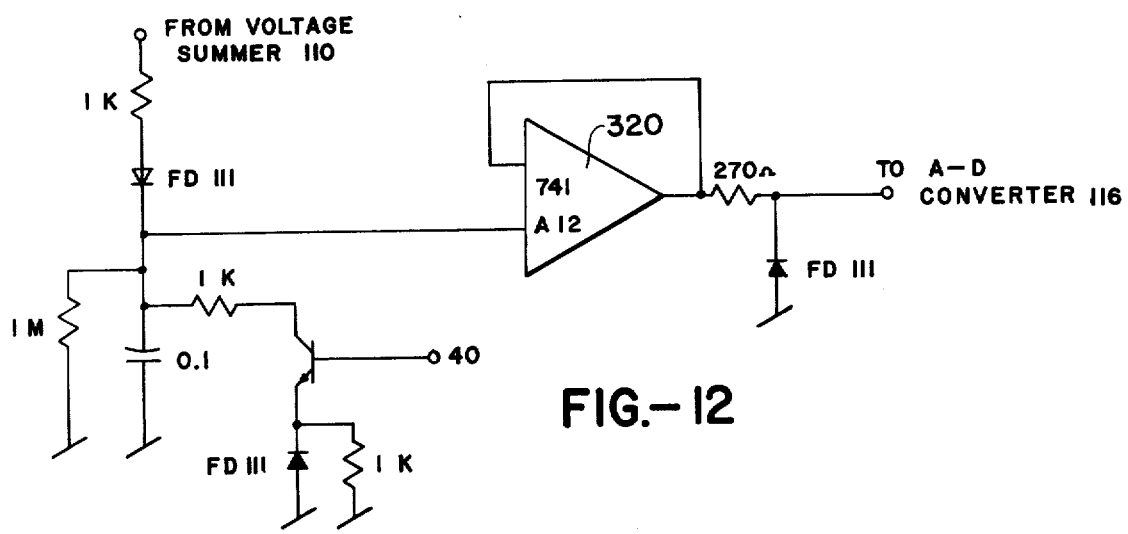
FIG.-12

APPARATUS FOR OPTHALMOLOGICAL PRESCRIPTION READOUT

This is a continuation of now abandoned application Ser. No. 385,784, filed Aug. 6, 1973.

This invention relates to an optometric device having variable spherical and astigmatic optical inputs for directly describing combined spherical and astigmatic prescriptions for the eye.

SUMMARY OF THE PRIOR ART

Heretofore optometric measurements of spherical and cylindrical optical inputs in prescribing eyeglasses have had complicated instrumentation. Broadly, optometric instruments have included a large number of discrete spherical optics and cylinder optics of various powers. Typically, spherical lenses are sequentially inserted into and out of the eye path in the optical train to provide the optimum optical spherical correction. Additionally, cylindrical optics are sequentially inserted into and out of the eye path in the train. These optics are both chosen as to power and rotation to provide an optimal prescription.

With regard to conventional optometric devices, it should be noted that the spherical eyeglass prescriptions are interrelated to the astigmatic eyeglass prescriptions. Changes in cylinder prescription alter the average spherical optical output. The examiner must accommodate his examination procedure to these changes of average spherical power which are coupled to changes of cylinder power.

From these complex interrelated discrete lens movements, the eye examiner generates an eyeglass prescription. This is done by first noting the optimum spherical and cylindrical power and cylinder rotation.

The adaptation of such prior art optical devices to automated digital readout is desirable. However, such automated digital readout is complicated by the conventional discrete optics used, their discontinuous use, and their underlying theory of prescription.

Since discrete lens elements are used for both spherical and cylindrical power, the output from such discrete lens elements, when they are placed into and out of the view path of the patient is discontinuous. This complicates the input to any remote readout equipment. Separate and discrete inputs must be made for separate and discrete spherical and cylindrical elements used.

Additionally, conventional eyeglass precription techniques and prescription description techniques can generate error (especially low cylinder optics rotation).

SUMMARY OF THE INVENTION

An eye testing device having variable spherical and cylindrical optic inputs along a light path from an image is provided with apparatus for digital readout of sphere power and astigmatic power to provide a complete eyeglass precription. A first electrical analog of astigmatic lens power is determined and varied responsive to patient objective or subjective visual acuity through first astigmatic optics along first and second substantially perpendicular axes normal to the light path. A second electrical analog of astigmatic lens power is measured through second astigmatic optics along third and fourth axes normal to the light path. These third and fourth axes are positioned relative to the first and second axes so that first imaginary planes taken through the first and second axes including the view path do not coincide with imaginary planes taken through the third and fourth axes including the view path. This second electrical analog of astigmatism is determined and varied responsive to patient objective or subjective visual acuity through second astigmatic optics. Analog or digital computer apparatus resolves the two electrical inputs on the basis of a Cartesian coordinate plot having first and second axes. The first electrical analog forms one component of the Cartesian coordinate plot and the second electrical analog forms the second component of the Cartesian coordinate plot. Computer resolution of the power of the resultant polar coordinate vector gives the power of the resultant astigmatic prescription. Similarly, computer resolution of the angle of the resultant polar coordinate vector, when divided by one half, gives the astigmatic orientation. Provision is made to superimpose the spherical prescription upon the resultant astigmatic prescription to provide a total automated spherical and cylindrical patient eyeglass prescription.

OTHER OBJECTS AND ADVANTAGES OF THE INVENTION

The primary object of this invention is the provision for automated readout of the complete spherical and astigmatic eyeglass prescription.

An object of this invention is to generate a system of astigmatic optic prescription which can lend itself to simplified computer resolution. According to this aspect of the invention, only mere computer conversion from Cartesian coordinates to polar coordinates is required.

A further object of this invention is to disclose optics which have outputs corresponding to the simplified system of astigmatic prescription. According to this aspect of the invention, paired continuously adjustable astigmatic optics are utilized. These optics are provided with analog outputs which serve as the inputs for the simplified computer inputs of this invention.

An object of this invention is to disclose optics which can provide a continuous input to automated eyeglass prescription readout equipment. According to this aspect of the invention, variable spherical and variable astigmatic optics are inserted in the patient image eye train. Upon adjustment of the respective variable spherical optics and the variable astigmatic optics, correspondent continuously adjustable electric analogs are generated.

A further advantage of the gradually changing spherical and astigmatic optics is that a corresponding continuously gradually changing electrical analog output can be generated. Simplified, computer inputs result.

A further advantage of this invention is that the readout of the prescription can be provided at locations remote from the patient. Uncomfortable examiner-patient confrontations are avoided.

An additional object of this invention is to disclose an automatic readout device for optometric prescription which is especially useful in conjunction with continuously variable astigmatic and spherical lenses.

An advantage of the electrical analog input of this invention used in conjunction with continuously variable astigmatic and spherical lenses is that the lens element movement is directly proportional to the required analog input for the circuitry used herein. Sine deviations common to couter-rotating cylinders and other methods for generating cylindrical lens input are not required.

Yet a further object of this invention is to disclose a single variable spherical power input and two dependent and variable cylindrical power inputs, each of which can be varied without requiring the variance of the remaining inputs.

An advantage of the elimination of the interdependence between the respective spherical and astigmatic inputs is that instrument operation is simplified. Correspondingly, computer input and corresponding computer operation and design is simplified.

Yet an additional advantage of the method of cylinder prescription and theory of computer operation —coupled with the preferred optics of this invention— is that error can be reduced. Low diopter cylinder angle can be determined with greater ease and accuracy. Further, computer computation made practical by the simplified inputs of this invention can occur. This computer input reduces the possibility of human error in prescription.

DESCRIPTION OF THE DRAWINGS

FIGS. 7–12 illustrate various system components of the system shown in FIG. 5.

DESCRIPTION OF THE PREFERRED EMBODIMENTS

Figure 1:
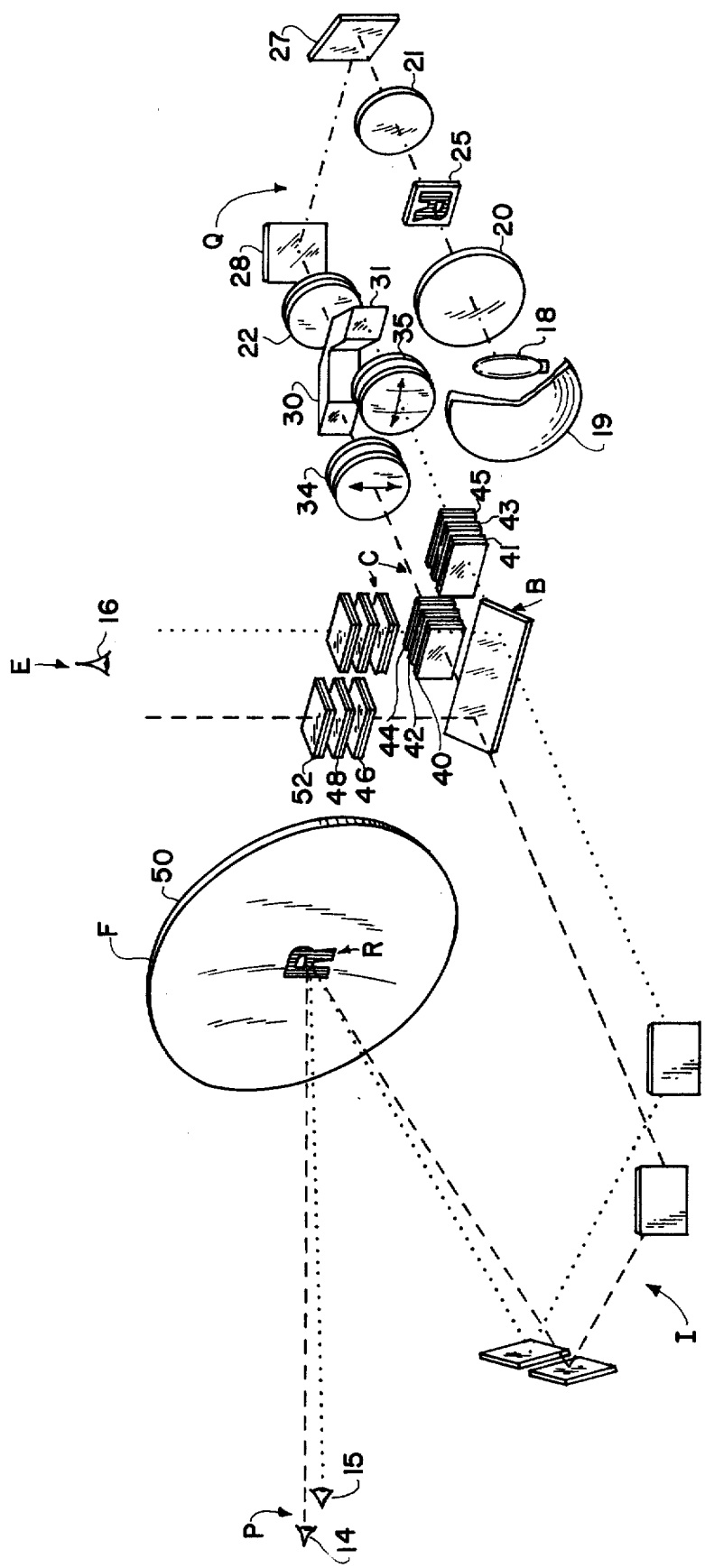
FIG. 1 is a perspective view of an eye test apparatus according to this invention illustrating the patient-projector eye path, and the patient-examiner eye path.

Referring to FIG. 1, a perspective view of an eye testing device useful with this invention is illustrated. Typically, a patient P schematically shown by left eye 14 and right eye 15 is shown viewing focusing optics F. Focusing optics F retrodirect a light path to folding optics I and to corrective optics C. Interocular drive I functions to adjust the instrument for variable patient interocular spacing.

Corrective optics C are shown in two locations. A first set of corrective optics lie between the patient P and a projector Q. Additionally, identical corrective optics C are located between the patient and the viewing examiner E, here schematically represented by eye 16. The viewing examiner E looks through examining optics (not shown) and interlopes at a beam-splitter B into the patient-projector eye path.

Patient P with his left eye 14 and right eye 15 views focusing optics F. Typically, the patient must be provided with a headrest or the like to maintain his eyes within given tolerances from the focusing optics F along the light path of the optical testing device. It should be understood that chin rests have deficiencies for this purpose as movement of the jaw in talking moves the eyes in viewing. Conventional headrests having headrest and bracing locations other than the chin will be sufficient to brace the patient for purposes of an examination.

Projector Q is a projection apparatus. A light source 18 and light projecting optics 19, 20, 21 and 22 function together to project an image of a slide 25. Projecting optics 19, 20, 21 and 22 are adjusted relative to slide 25 so as to project a real image R, hereshown as the letter R to focus at a near infinite distance. The corrective optics C serve to bring the real image R coplanar with focusing optics F.

Projector Q includes specially adapted optics for the eye testing device hereshown. Mirrors 27 and 28 are hereshown positioned to retrodirect the light path from projector 25. These mirrors are hereshown placed intermediate lens elements 21 and 22 of the projector.

Second, the projected light from the projector 22 passes through periscopes 30 and 31. Periscopes 30 and 31 respectively serve to project images for eyes 14 and 15 by splitting the image from the optics 22 into two separate paths, one path for each eye.

As required in conventional eye testing optics, the light paths must be compensated for traditional "wall-eye" or "cross-eye" corrections. Accordingly, relatively movable negative and positive lens pairs 34 and 35 are shown in each of the light paths to patient eyes 14 and 15 respectively. The negative-positive lens pair 34 has the positive and negative lens elements equipped for relative movement in the vertical direction. The negative-positive lens pair 35 has the negative-positive lens equipped for relative movement in a horizontal direction. As is known in the art, by conventional movements and corresponding measurements of the displacements of lens pairs 34 and 35, the power and rotation of wall-eye and cross-eye prism prescriptions can be made. In practice, it is advantageous to move one lens of each pair together horizontally, and to move the other lens of each pair together vertically.

Corrective optics C are illustrated in two locations. For the purposes of a preliminary understanding of this invention, the corrective optics C in the projector Q-patient P light path will first be discussed.

Corrective optics C consists of relatively movable variable focal length or variable spherical optics 40 for the eye path of patient eye 14 and relatively movable variable focal length or variable spherical optics 41 for the eye path of patient eye 15. Both of these optics consist of paired variable focal length lenses which move relative to one another to achieve the desired spherical correction neccesary to prescribe for the patient. Such paired countermoving optical elements are fully described and set forth in the Luis W. Alvarez U.S. Pat. NO. 3,305,294, entitled "Two-Element Variable-Power Spherical Lens," and the Luis W. Alvarez and William E. Humphrey U.S. Pat. No. 3,507,565, entitled "Variable-Power Lens and System."

Additionally, astigmatic inputs for correction of patient P astigmatism are required. These astigmatic inputs occur at relatively movable lens pairs 42 and 44 for eye 14, and 43 and 45 for eye 15. The configuration of each of the pairs of lens optics 42–45 are well as the effect of correction which occurs upon lens optics relative movement is fully described in William E. Humphrey U.S. Pat. No. 3,751,138, entitled "Variable Anamorphic Lens and Method for Constructing Lens" (co-pending Patent application Ser. No. 235,134, filed Mar. 16, 1972).

One comment can be made about this astigmatic generated by variable astigmatic lens pairs 42 and 43 on one hand, and 44 and 45 on the other hand. Preferably, these variable astigmatic lenses are selected so that variable astigmatic lens pairs 40 and 42, for example, generate astigmatism along rotational alignments 45° one from another. Thus by relative movement of the lens pairs of each of the elements 42–45, virtually all optically practical astigmatic prescriptions can be generated.

Focusing optics F function to focus a real image of the corrective optics C to the eyes 14 and 15 of patient P. Stated on other terms, the real image P projected by the projector Q through the corrective optics C is the same as if the corrective optics C were removed from their location in the projector light path and placed immediately in front of eyes 14 and 15 of patient P. Focusing optics F are hereshown as a field mirror 50.

Understanding this much of the invention set forth, and ignoring beam-splitter B and the observing light path O to examiner E, a subjective refraction of patient P can now be discussed.

Basically, patient P is asked to look at the real image R projected on focusing optics F. Thereafter, spherical correction is made by relative movement of the variable lens pairs 40 for patient eye 14, and 41 for patient eye 15 until optimum vision of the real image R occurs. Thereafter, astigmatic input can be made by sequential relative movement of relatively moving lens variable lens pairs 42 and 44 for the left eye 14 of patient P, and relatively moving lens pairs 43 and 45 for the right eye 15 of patient P.

Typically, the lens sequence of operations of relatively moving lens pairs 40, 42 and 44 will be repeated twice to obtain an optimum refraction for patient eye 14. Similar repeat of the sequence of operations of adjustment of relatively moving lens pairs 41, 43 and 45 will be made to achieve adjustment for eye 15.

It will be understood by those skilled in the art that dependent upon the magnification of the focusing optics F hereshown as field mirror 50, the amount of correction actually placed into the corrective optics C will provide a different effective correction to the patient P at the patient viewing station. Usually the instrument will be constructed for unit magnification. In these circumstances, the diopter correction applied at the corrective optics C will relate precisely to the effective diopter correction that the patient views.

Where, however, the effective magnification of the focusing optics is other than unity, the diopter correction for the patient Dp is related to the diopter correction at the corrective optics Dc as follows: $Dp = Dc(M^2)$ where M is the ratio of the focusing optics (field mirror) to corrective optics distance over the focusing optics to patient eye distance.

Having set forth the function of this instrument to provide a subjective refraction, attention can now be given to the examiner-patient light path. Typically, the examiner-patient light path is detoured at a beam-splitter B. It will be observed that the detour of beam-splitter B is between corrective optics C at lenses 40–45 and the patient P. There is an important reason for this placement.

It has been found that the relatively intense light of projector Q when projected through corrective optics C causes many reflections at the air-glass interfaces provided by the relatively moving optics of lens pairs 40–45. Ideally, these reflections from the relatively moving lens pairs should not be reflected into the examiner-patient light path. Therefore, by the placement of beam-splitter B between the corrective optics C and the patient P, all reflections of the corrective optics C relative to projector Q will pass into the projector Q light path and not the examiner E light path.

Beam-splitter B functions to divide out light from the projector Q. It has been found preferable to detour 80 percent of the light from the eyes of patient P to the examiner E. This unbalance of beam-splitter B can be compensated for by providing a relatively high output from projector Q. It has also been found useful to provide a beam-splitter composed of a fully reflective surface with one or morre small apertures in the reflective surface through which illumination may be passed to the patient P, while return light is collected from the fully reflective area. In this way, the optics may be adjusted so that the small apertures lie reimaged in the plane of the corner, and the corneal reflection is, in turn, reflected to the area of small apertures, and hence only poorly reflected into the optical path of examiner E.

To provide an objective eye examination of patient P it is necessary that the examiner E look through corrective optics C, which corrective optics C are identical to those corrective optics through which projector Q projects the real image R. Accordingly, on each side of beam-splitter B there are provided identical relatively moving variable lens pairs corresponding to each of the variable lens pairs previously described.

It is not intended to exclude the possibility of placing the beam-splitter between a single corrective optics C and projector Q; however, present day antireflective coatings are not sufficiently effective to provide as high a quality result as the approach hereshown.

Take the case of eye 14 and variable spherical optics 40, and variable astigmatic optics 42 and 44. Typically, variable spherical optics 46 identical to variable spherical optics 40 are provided. Similarly, variable astigmatic optics 48 identical to variable astigmatic optics 42 are provided. Finally, variable astigmatic optics 52 identical to variable astigmatic optics 44 are provided.

It will be remembered that each of the variable lens pairs comprises two pieces of relatively moving glass which generate the variable lens effect, be it astigmatism or conventional spherical lens correction. Accordingly, it is desirable to use identical lens elements for each of the correspondent pairs of optics above mentioned. Furthermore, it is desirable to produce precisely identical relative movement between the relatively moving lens pairs.

Precisely identical lens movement must occur between the relatively moving pieces of glass of lens pairs 40 and the relatively moving pieces of glass of lens pairs 46. Similarly, precisely identical lens movement between the relatively moving pieces of glass pairs 42 must be identical to the movement of the pieces of lens pairs 48. Finally, precisely identical movement between the pieces of glass of lens pairs 44 must be identical to the relative movement of the pieces of glass of lens pairs 52. A mechanism which produces this movement can be seen with reference to FIG. 2.

Figure 2:
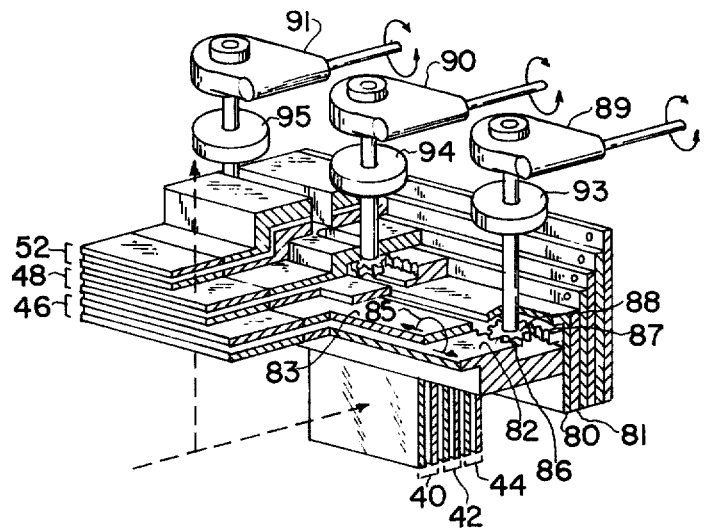
FIG. 2 is a perspective view of the corrective optics and apparatus for relatively moving the corrective optics of a preferred embodiment of this invention, the illustrated apparatus specifically showing the location of variable resistors for generating the electrical analog output required for computer input in this invention.

Referring to FIG. 2, relatively moving lens pairs 40 are each shown attached to brackets 80 and 81. Similarly, relatively moving lens pairs 46 are attached to brackets 82 and 83. Each of the brackets 80 and 81 on one hand, and 82 and 83 on the other hand, are mounted for relative sliding movement with respect to one another along the direction of the arrows 85.

Identical movement of the lens elements is produced by opposed racks driven from a common pinion. Basically bracket 82, which is rigidly connected with bracket 80, defines a first rack 86. Similarly bracket 81, which is rigidly connected to bracket 83, defines a second opposed rack 87. A pinion 88 and pinion drive 89 move the racks in equal and opposite directions. Thus the paired lens elements of variable spherical lenses 40 move equally and opposite to the identical variable spherical lens optics 46.

As is illustrated in FIG. 2, identical structure for variable astigmatic lens optics 42 and 48 produces identical relative movement responsive to turning of a control 90. Similarly, identical structure for lens elements 44 and 52 produces identical relative movement for the identical astigmatic lens elements responsive to turning of a control 91, the internal members here not being shown.

It will be appreciated that the apparatus shown in FIG. 2 only produces variable prescription for eye 14 of patient P. Identical apparatus must be provided for lens pairs 41, 43, 45, 47, 49 and 53 for right eye 15 of patient P. This apparatus will not be described as it is merely a repeat of the apparatus previously described with reference to FIG. 2.

For a more complete understanding of the optics here illustrated, incorporation by reference is made of my co-pending Patent application entitled "Eye Test Apparatus," Ser. No. 371,809, filed June 20, 1973.

It should be appreciated that the eye test apparatus hereshown varies the "image" seen by the patient responsive to his own subjective or objective prescription. It will be appreciated by those having ordinary skill in the art that the more conventional system of varying corrective optics between an eye chart (either screen projected or of the printed type) will work with the disclosure of this invention. It is only required that an output responsive to corrective input be made.

For an example for more conventional "images" employing either projected eye charts or printed eye charts, incorporation by reference is made of my co-pending Patent application Ser. No. 263,329, filed June 15, 1972, entitled "Optometric Apparatus and Process Having Independent Astigmatic and Spherical Inputs".

Having set forth the eye test apparatus and the process of eye testing, it now is necessary to understand the theory of the invention. This can best be illustrated with a plot of the astigmatic correction generated by turning controls 90 and 91 of the apparatus shown in FIG. 2. This plot is made upon the superimposed Cartesian-polar coordinate plot of FIG. 3. Plot of the astigmatic correction on a Cartesian coordinate basis first occurs. Thereafter, translation of the Cartesian coordinate plot into a convention polar coordinate plot for setting forth astigmatic correction to the eye will be made.

It should be remembered from this point onward that correction for left eye 14 only will be discussed. As correction for right eye 15 is identical and constitutes merely a repeat, its description will be omitted.

Figure 3:
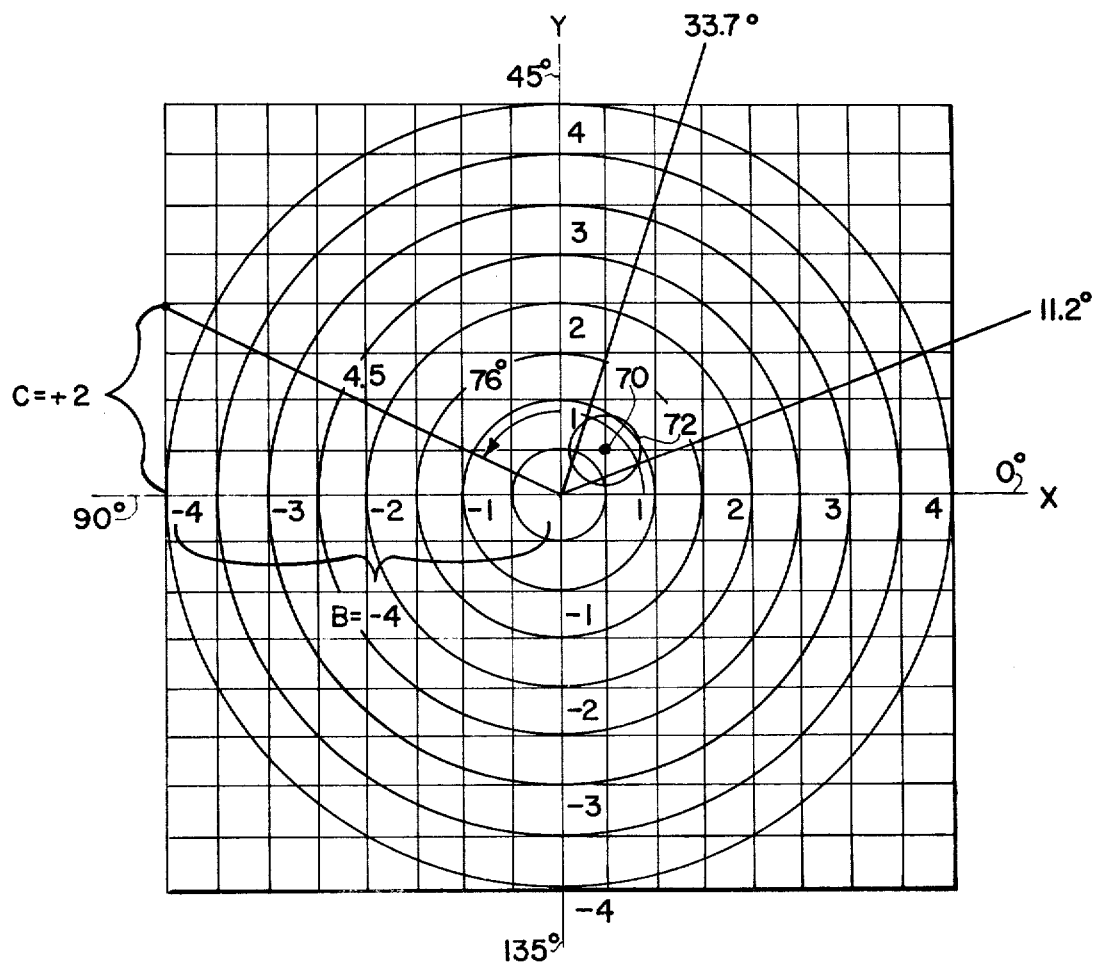
FIG. 3 is an algorithm of a superimposed Cartesian coordinate plot and polar coordinate plot illustrating the analog and digital computer steps of the polar coordinate conversion of the two discrete astigmatic inputs of this invention.

Referring to FIG. 3, it will be assumed that lens pairs 42 and 48 provided a −4 diopter correction. This minus diopter setting indicates a negative cylindrical correction in the vertical direction. This plots on the rotationally expanded scale of FIG. 3 to a −4 diopter in the horizontal and negative X axis direction.

It will be assumed that lens pairs 44 and 52 provided a +2 diopter correction. Since the astigmatic input of lens elements is along the 45°-135° axis, this is the equivalent of a +2 diopter setting in the vertical and positive Y axis of the Cartesian coordinace plot of FIG. 3 (it again being remembered that the angle of the cylinder plot has been expanded by a factor of 2).

The Cartesian coordinate plot converts to conventional cylindrical lens angle. However, the cylindrical lens angle has been doubled or multiplied by a factor of 2. Thus, in the plot illustrated in FIG. 3, 180° of cylindrical lens rotation appears over 360° of actual polar coordinate plot.

Referring to FIG. 3, it can be seen that the −4 diopter setting of the lens elements 42, 48 and the +2 diopter setting of the lens elements 44, 52 has resulted in a 4.5 diopter cylindrical lens adjustment to the prescription at an angle of approximately 76°.

This particular lens setting is an extreme lens setting. Very few optical corrections are required that are that strong. This particular illustration is given here so that the polar coordinate plot of this invention may be set forth and thereafter understood.

It will be realized to those skilled in the art that the particular form of Cartesian coordinates used here has an additional advantage. Specifically, at low diopter power, conventional polar coordinate system prescription of astigmatic lenses becomes unwieldly. This inconvenience is due to the margin of error and the fact that the error increases with respect to angular rotation as lower diopter cylindrical lens corrections are required.

An example of this error plotted into these coordinates can be helpful.

Assume that an astigmatic prescription has each Cartesian coordinate of a value of +½ of a diopter correction. Assume further that the uncertainty of the measurement could be + or −½ diopter.

Referring to FIG. 3, it can be seen that the two coordinate ½ diopter prescription has been plotted at 70. Moreover, the area of possible error in the ½ diopter has been plotted at 72. Assuming that the visual error of the patient in the astigmatic correction could fall anywhere within the circle 72 it can be seen that the polar coordinate plot produces large error in angular description. For example, assuming that the point of the instrument was to fall somewhere within the circle 72, the angle of that circle could range anywhere between 11.2° and 33.7°.

It will be further remembered that in actual physical practice if a cylindrical lens element is rotated to produce a ½ diopter setting, the mechanics of determining when the eye's vision is actually improved becomes very hard. In practice, it has been found that relatively large increments of rotation over large numbers of degree are required to bracket the desired visual correction in astigmatic input.

Having proceeded this far, it will be seen that the invention herein described has a synergism not immediately apparent. Lenses 42, 44, 48 and 52 are each independent of the spherical optics 40 and 46 used in the combination. Second, and just as important, a new prescription system, graphically illustrated in FIG. 3, has been developed. By collating the effective independent optical inputs of lens elements 42 and 48, and lens elements 44 and 52, on axes 90° apart, the polar coordinate convention heretofore used is converted to a Cartesian coordinate system. This Cartesian coordinate system has the capability of being readily translatable into the older and more conventional cylinder optical description of angle of rotation and diopter power. Moreover, and as demonstrated in the plot of 70 and the error of circle 72, at low diopter power of optical correction, the rotation of the low power cylindrical lens has a potential uncertainty in the gross amount indicated by the plots at 11.2° and 33.7° on FIG. 3 while the Cartesian coordinates used herewith have a uniform uncertainty for all values of correction.

For a complete understanding of the theory herein illustrated on FIG. 3, as well as alternate continuously adjustable spherical and cylindrical optics which can be used with this invention, incorporation by reference is made of my co-pending Patent application Ser. No. 263,329, filed June 15, 1972, and entitled "Opthalmological Apparatus and Process Having Independent Astigmatic and Spherical Inputs".

Having set forth the theory upon which this invention operates, the supplemental computer digital outputs can now be discussed. First, an analog computer for generating the complete eyeglass prescription will be set forth. Thereafter, a digital computer with appended digital program for generating the solution will be discussed.

Both the digital computer and the analog computer require an input. In the continuously adjustable optics used in the preferred embodiment of this invention, variable resistance pots 93, 94 and 95 will generate spherical, astigmatic and astigmatic electrical analog outputs. These outputs will usually be generated by applying a voltage across the potentiometer 93–95 and taking out the voltage as a function of the displacement of the variable optics.

It will be appreciated by those having ordinary skill in the computer art that a virtually unlimited number of devices can be used to generate inputs responsive to the movement of the optics herein used. Examples of such devices can include variable capacitances, inductances and virtually any other device which is preferably continuously responsive to relative lens movement in an analog output.

Regarding the analog computer of this invention, it has been found that the problem of resolving the Cartesian coordinate input to the correspondent polar coordinate output can be readily resolved utilizing an alternating current actuated analog computer.

Assume that the electrical analog output of potentiometer 94 is a voltage $V_1$, and the electrical analog output of the potentiometer 95, shown in FIG. 2, is a voltage $V_2$. Therefore, the relation:

$$V_1 \sin \omega t + V_2 \sin(\omega t + 90°) = V_1 \sin \omega t + V_2 \cos(\omega t)$$

must be true where $\omega$ is the frequency and $t$ is time. It is known that the two voltages will result together, in an equivalent voltage. From the known trigonometric functions, an equivalent voltage $V_3$ can be related as follows:

$$V_3 \sin(\omega t + \phi) = V_3 \sin \omega_t \cos \phi + \cos \omega_t \sin \phi$$

where $\phi$ is the phase angle difference between the resultant frequency of the combined voltages and the original frequency $\omega t$.

Referring to the resultant voltages and remembering the polar coordinate plot of FIG. 3, then:

$$V_3 \cos \phi = V_1 \text{ or } \cos \phi = \frac{V_1}{V_3}$$

and:

$$V_3 \sin \phi = V_2 \text{ or } \sin \phi = \frac{V_2}{V_3}$$

since:
$$\sin^2 \phi + \cos^2 \phi = 1$$
then:

$$\frac{V_1^2}{V_3^2} + \frac{V_2^2}{V_3^2} = 1$$

which results in the relation:
$$V_1^2 + V_2^2 = V_3^2$$

Therefore, assuming a root mean square alternating current output from the potentiometers 94–95, illustrated in FIG. 2, the sum of this root mean square alternating current will indicate the power of the cylinder prescribed.

Noting the relation:
$$V_3 \sin(\omega t + \phi)$$
it will be seen that the voltage plot of the resultant voltage $V_3$ will be out of phased by the phase angle $\phi$. The phase angle $\phi$ will be thus analogous to the cylinder angle when it is divided by 2. This can be understood by remembering that the polar coordinates in the graph of FIG. 3 were expanded by a factor of 2 with the 180° being plotted over a 360° of polar coordinates.

Figure 4:
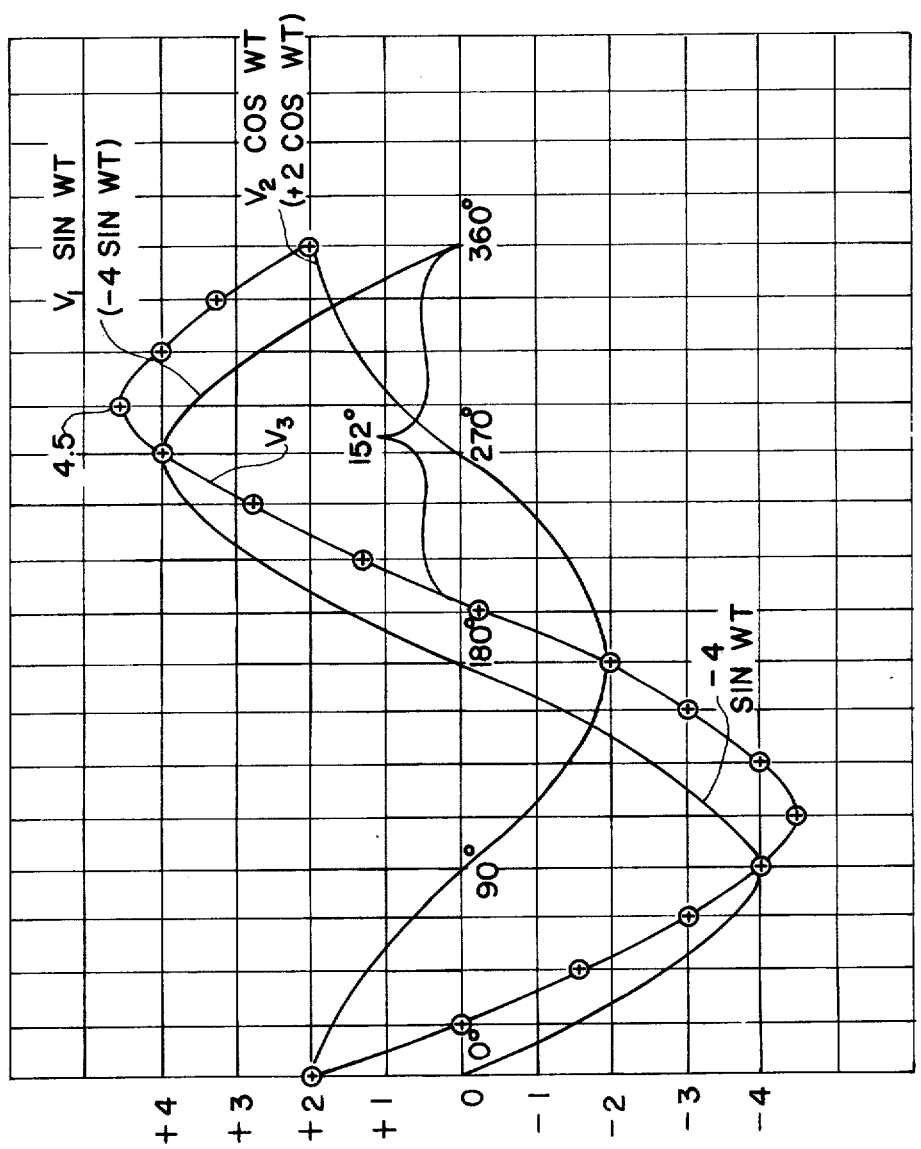
FIG. 4 is an algorithm of a superimposed sine, co-sine plot useful in understanding the analog generation of the cylinder power and angle of an analog computer which forms a part of this invention.

Turning to FIG. 4, the specific eyeglass prescription of FIG. 3 has been plotted. It will be seen that the maximum value of the resultant voltage $V_3$ is 4.5 and the phase angle difference between the intersection of the function $V_3 \sin(\omega t + \phi)$ and the zero axis on one hand, and $V_1 \sin \omega t$ and the zero axis on the other hand (at the start of the sine generation function) is approximately 152°. Halving 152° results in the 4.5 cylinder diopter at 76° prescription set forth in FIG. 3.

Having set forth the algorithms necessary for the understanding of the astigmatic component of this invention, the combination of the astigmatic components herein provided with conventional spherical components may now be discussed.

Returning to the example of FIG. 4 wherein a 4.5 diopter cylinder prescription was generated at an angle of 76°, this cylinder prescription can be translated into two discrete components. One component can be a +2.25 cylinder at 76°; the remaining component can be a −2.25 cylinder at 166°. Assume that a spherical correction of −2 diopters has been determined by relative movement of the paired lens elements 40. It now becomes necessary to combine the cylindrical and spherical outputs.

By adding crossed cylinders of positive 2.25 diopters to the cylindrical prescription, an output of positive 4.5 diopters is generated. Correspondingly, by subtracting from the spherical prescription 2.25 diopters (remembering that spherical lenses can be generated by crossed cylinders), the resultant spherical prescription becomes −4.25 diopters.

Reference to the example of the cylindrical prescription shown at 70 in FIG. 3 may be helpful. The prescription thereshown is 0.7 diopters at 22-1/2°. This is equivalent to crossed cylinders of +0.35 diopters at 22-1/2° and −0.35 diopters at 112.5°. Assume further that a spherical correction of a +1 diopter is required.

Adding to the cylindrical prescription +0.35 diopters gives a resultant prescription of 0.7 diopters at 22-1/2°. Subtracting this diopter powers from the sphere would generate a +0.65 spherical prescription.

It should be noted that these latter prescriptions are the conventional prescriptions in the prior art which it is the object of this invention to generate.

Having set forth the algorithms necessary for the understanding of the analog computer of this invention, and having run through the conventional calculations necessary to convert crossed cylinders of opposite power into standard superimposed cylinder, cylinder angle and sphere prescriptions, operation of the computer mechanism used with this invention may be discussed. For purposes of this discussion, simultaneous references will be made to FIGS. 4 and 5.

Figure 5:
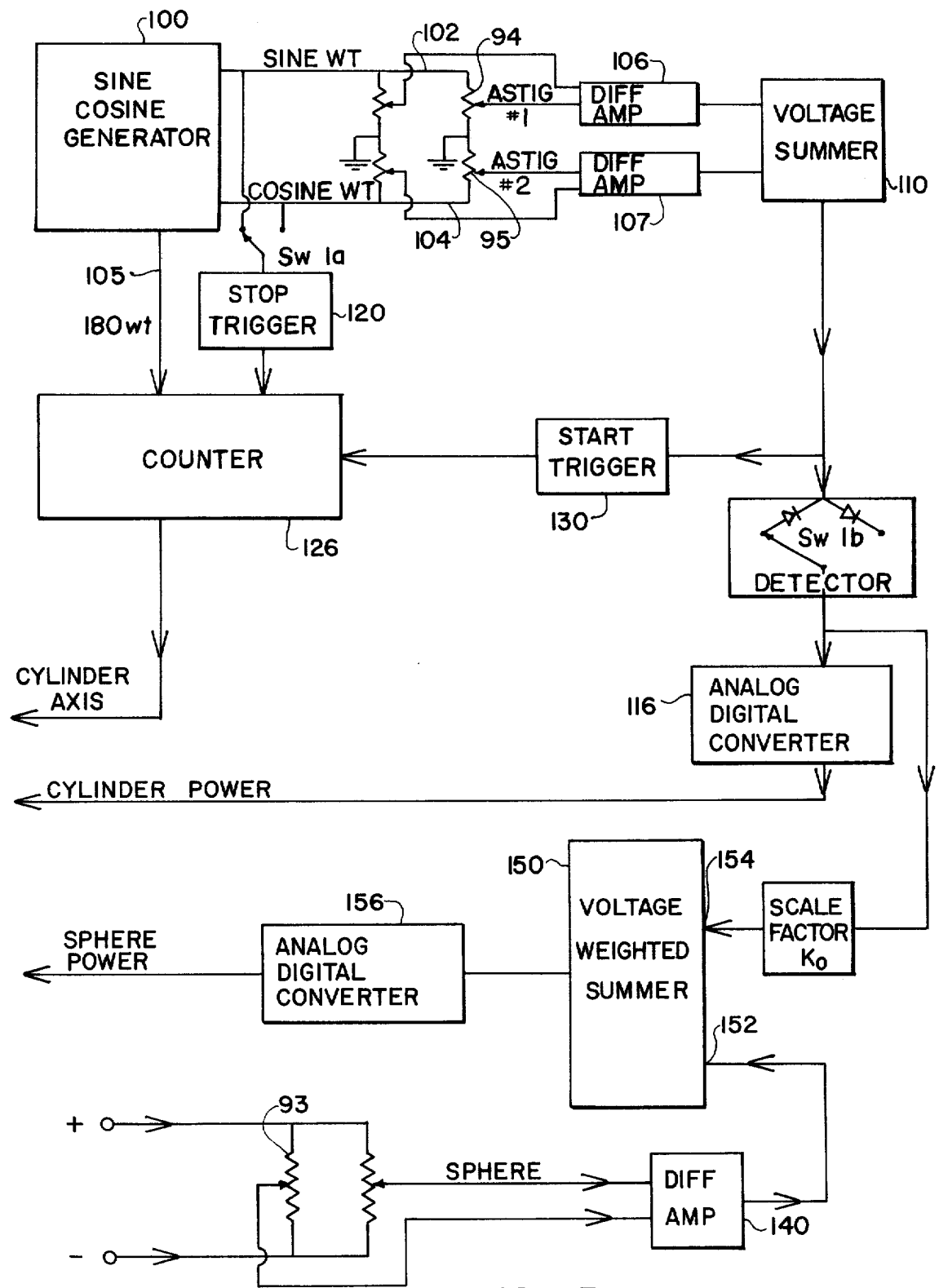
FIG. 5 is a block diagram of analog computer equipment useful in conjunction with the preferred optical array of this invention to generate automated cylinder axis, cylinder power and spherical power readouts for a complete eyeglass prescription.

Keeping in mind the example of FIG. 4 and referring specially to FIG. 5, a sine-cosine generator 100 is schematically illustrated having a sin ωt output 102 and a cos ωt output 104. Variable resistors 94 and 95 are connected to provide differential amplifiers 106 and 107 with signals of the alternating current output correspondent to the movement of astigmatic lens pairs 42, 44 respectively. These differential amplifiers channel a signal to voltage summer 110 which generates a weighted sum signal corresponding to curve $V_3$ of FIG. 4. The output of voltage summer 110 is coupled to a peak detector 115 which generates a signal representative of the peak value of the amplitude of resultant sine wave $V_3$ shown in FIG. 4.

The output of peak detector 115 is coupled to an analog to digital converter 116 which measures typically the root mean square resultant voltage to give cylinder power. In the preferred embodiment, converter 116 comprises an Analog Devices, Inc. Type ADC8S analog-to-digital converter. In the specific example shown in FIGS. 3 and 4, the input of sin ωt would be −4 diopters (at variable resistor 94), the input of cos ωt would be +2 diopters (at variable resistor 95), and the output at the analog to digital converter 116 would be 4.5 diopters.

Determination of the angle of the resultant crossed cylinders of this invention is easily done. Broadly, a start trigger 130 begins the accumulation of a counter 126 which counts to 180 for a full cycle of the sin ωt function illustrated on FIG. 4. The advance of counter 126 is started when the resultant sine wave $V_3$ goes from negative to positive. Counter 126 is clocked by reference signal output 105 of sine-crossing generator 100.

This counter is stepped when the function sin ωt goes from negative to positive (it being remembered that $V_1$ sin ωt is a negative sine function and goes from positive to negative at this juncture). Stop trigger 120 actuates this function at counter 126. The resultant accumulation gives the angle of the effective crossed cylinders which in this case would be the equivalent of a positive 2.24 diopter cylinder at 76°, and a negative 2.25 diopter cylinder at 166° or as described by the convention herein 4.5 diopters at 76°.

It will be realized that it is required to superimpose upon the cylinder axis and cylinder power the desired spherical prescription. Specifically, variable resistor 93 feeds an electrical analog input to a conventional differential amplifier 140. Differential amplifier 140 feeds its output to a conventional voltage weighted summer 150.

Under ordinary operation of this invention, the voltage weighted summer 150 has two inputs. One input is the sphere power at 152 from the differential amplifier 140. The other input is the sphere power from the cylinder output at 154. The output of the voltage weighted summer goes to an analog to digital converter 156 and reads directly in the desired sphere power corrected for the cylinder power used with the invention. In the case here illustrated, this will be minus 4.25 diopters of sphere.

The several system components described immediately above are preferably implemented in the manner depicted in FIGS. 7–12. Sine-cosine generator 100, shown in FIG. 7, comprises a quadrature oscillator which includes a pair of commercially available Type 741 (Fairchild semiconductor F741393) operational amplifiers 301, 302 and the associated circuit components depicted in this figure for generating the sine ωt function signal 102 and cos ωt function signal 104. In addition, generator 100 includes a signetics Type NE565 phase locked loop 304 which is biased by the components depicted to provide a center frequency of 360f, where $f = ω/2π$, for the voltage controlled oscillator incorporated therein. The output of phase locked loop 304 is coupled through a transistor 305 to provide a square wave output signal 105 having a frequency 360f. The output of transistor 305 is coupled to the input of a first one of a pair of Type 7492 divide-by-6 counters 306, 307 coupled in tandem. The output of divide-by-6 counter 307 is coupled to the input of a Type 7490 divide-by-10 counter 308. The three units 306–308 thus divide the 360f reference signal by 360. The output signal is coupled as a reference to an input of phase locked loop 304 to ensure that the 360f reference signal is locked in phase to the sin ωt output signal 104.

Figure 8:
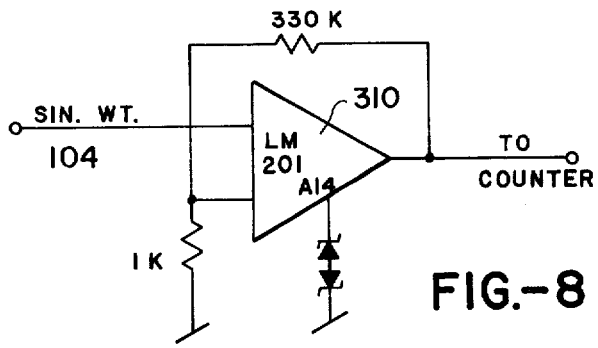

The sin ωt output signal from sine-cosine generator is coupled to the input of stop trigger circuit illustrated in FIG. 8. As depicted therein, stop trigger 120 comprises a National Semiconductor Type LM201A operational 310 interconnected as shown.

FIG. 9 shows the preferred embodiment of differential amplifier 106 and, as seen in the figure, comprises three Type 741 operational amplifiers 312–314 interconnected in a cconventional differential amplifier configuration. Differential amplifiers 107 and 140 are substantially identical to differential amplifier 106.

FIG. 10 shows voltage summer 110 which comprises a conventional resistance summing network 316 and a Type 741 operational amplifier 317.

The output of voltage summer 110 is coupled to the input of start trigger circuit 130 shown in FIG. 11. Start trigger 130 comprises a Type 741 operational amplifier 318 coupled in tandem to one input of a Type LM201A operational amplifier 319, the output of which provides the start trigger signal.

The output of voltage summer 110 is also coupled to the input of peak detector 115 shown in FIG. 12. Peak detector 115 includes a Type 741 operational amplifier 320 and the associated circuit components depicted in this figure.

As noted above, reference signal 360f 105 provides the clock input signal for a conventional counter (not shown). Since it is desired to provide a total count of 180 steps per one period of sin ωt, reference signal 105 is first divided by 2 so that the actual clocking frequency is 180f. The output of start trigger circuit 130 is used to enable initial advance of the counter from zero. The output of stop trigger circuit 120 is used to terminate incrementing of the conventional counter. The various states of the counter are decoded in a conventional manner to provide an indication of the maximum count attained.

Having disclosed an actual analog computer and components which, in fact, can result in the digital readout of cylindrical and spherical eyeglass prescription, it is apparent that a digital program can be written as well. A digital program written in FORTRAN IV whcih is directly directed for use on an IBM 1130 system follows. Input is assumed to be on cards with one card for the two Cartesian coordinates and the determined spherical power. Output is printed on a standard IBM printer connected to the IBM 1130 system. Any number of transformations may be done in one run. The data deck of the IBM 1130 system need only be followed by a "/*" card.

Figure 6:
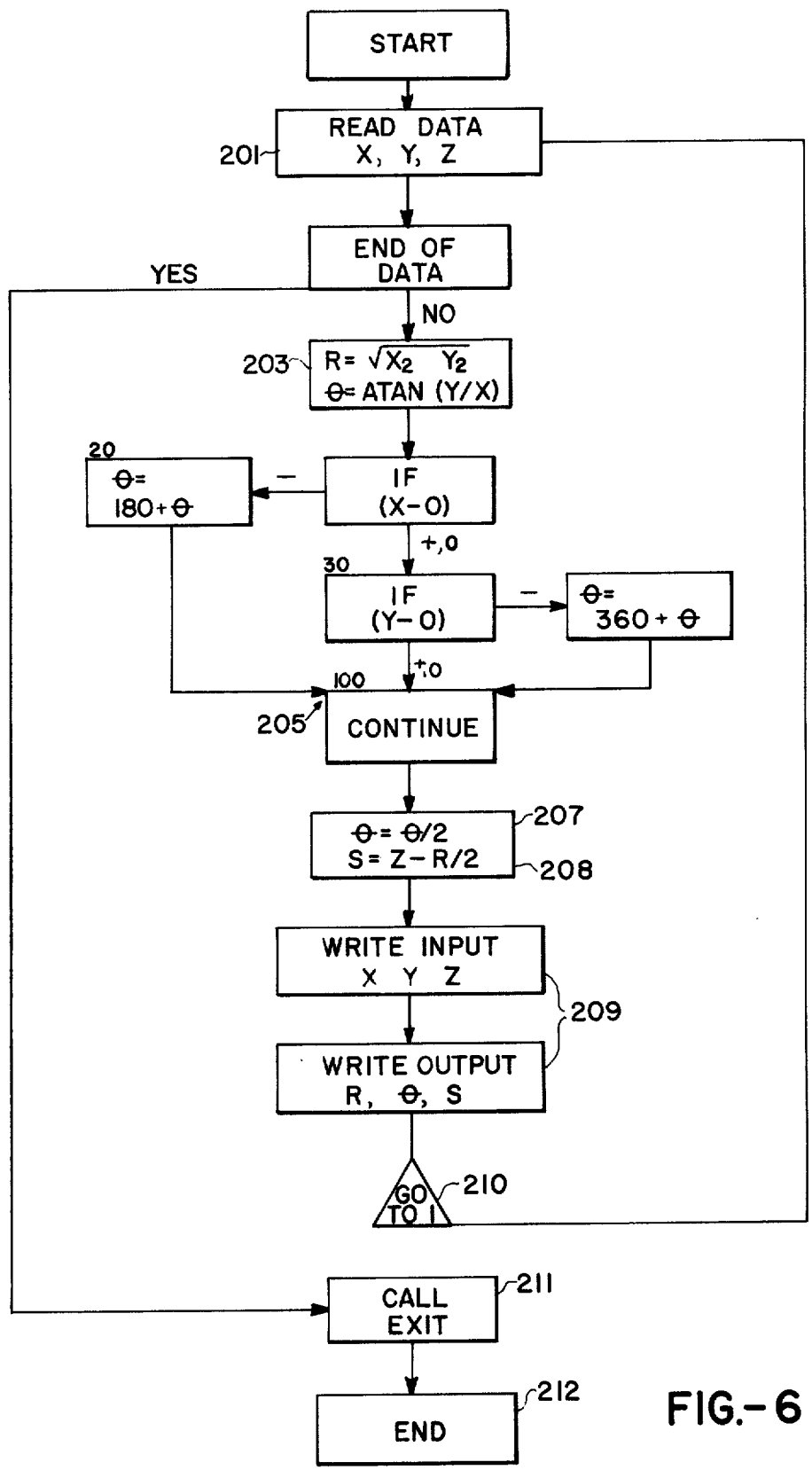
FIG. 6 is a flow chart of a digital resolution of the astigmatic components of this invention to an astigmatic prescription.
Figure 7:
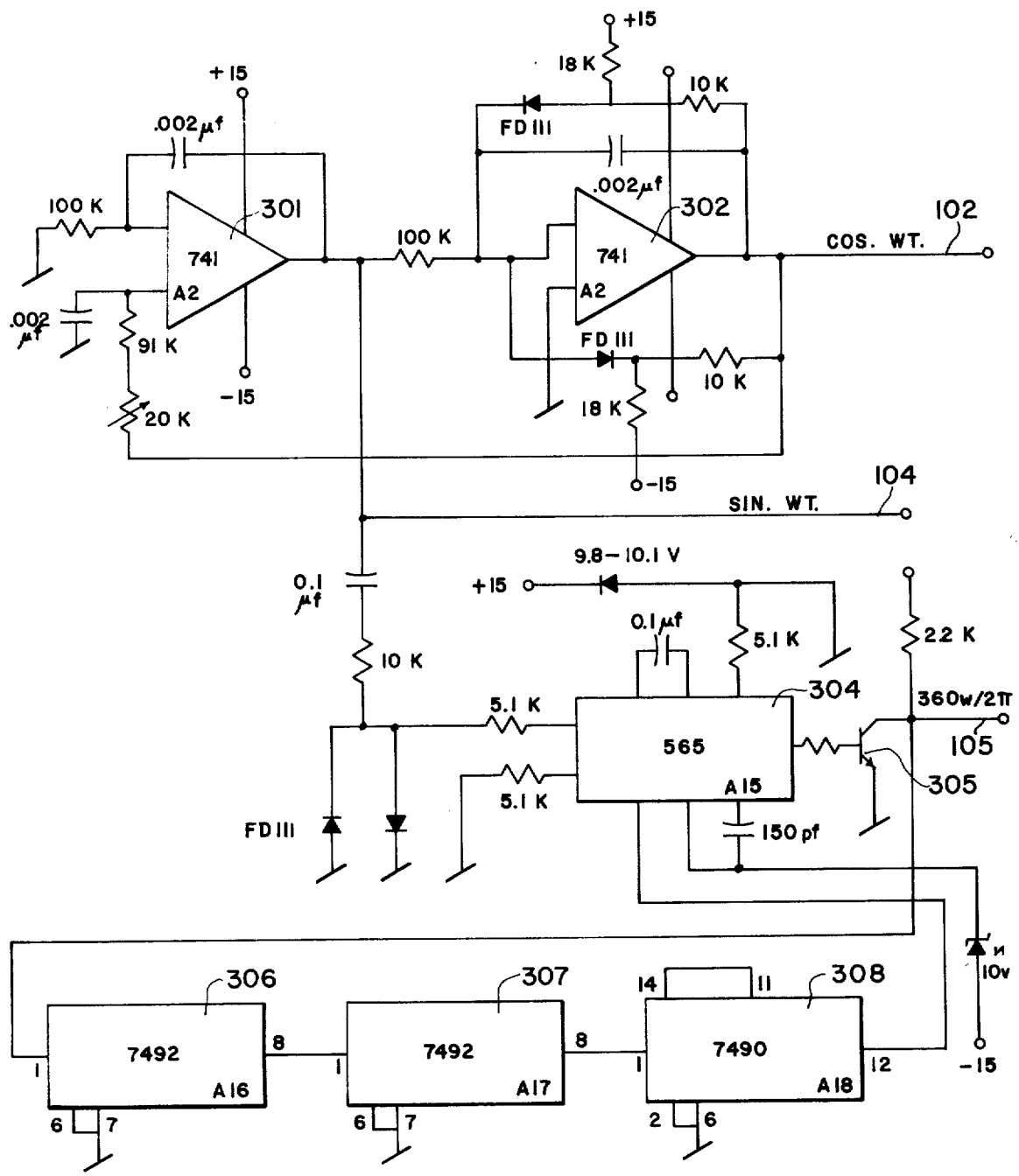

The computer program is described in the following paragraph with reference to the flow chart of FIG. 6. The notation C in card column 1 indicates an English equivalent statement of the immediately underlying card statements. As is known to those skilled in the digital computer arts, the English statement is not used; only the card statements are used.

For the convenience of the reader, conventional numeral reference is made to the flow chart. This reference is made in the computer program in brackets -[000]- to avoid confusion with the FORTRAN IV notations used herein.

The program written in correspondent card position lines and FORTRAN IV statements is as follows:

```
1 2 3 4 5 6 7 - CARD COLUMNS
/ /     J O B
/ /     F O R
  *   I O C S   (CARD, PRINTER)
  *   O N E     WORD INTEGERS
  *   L I S T   ALL
                DATA IEND /'/*'/
C               READ DATA CARD AND TEST FOR END OF DATA SET [201]
1               READ (2, 10) I, X, Y, Z
                IF (I-IEND) 2, 105, 2
C               CALCULATE LENGTH OF VECTOR [203]
2               R=SQRT (X**2 + Y**2)
C               CALCULATE ANGLE THETA FROM POSITIVE X AXIS [205]
                THETA = ATAN (Y/X)
                IF (X-0) 20, 30, 30
2 0             THETA = 180.0 + THETA
                GO TO 100
3 0             IF (Y-0) 60, 100, 100
6 0             THETA = 360.0 + THETA
1 0 0           CONTINUE
C               HALF ANGLE THETA [207]
                THETA = THETA/2.0
C               ADJUST SPHERICAL TERM [208]
                S=Z - (R/2.0)
C               PRINT INPUT AND OUTPUT [209]
                WRITE (5, 14) X, Y, Z
                WRITE (5, 15) R, THETA, S
C               RETURN AND READ ANOTHER DATA CARD [210]
                GO TO 1
1 0 5           CONTINUE
1 0             FORMAT (A2,F10.0,1X,F10.0,1X,F10.0)
1 4             FORMAT ('0','GIVEN X=',F12.5,3X,'Y=',F12.5,3X,'Z=',F12.5)
1 5             FORMAT('','CYLINDER=',F12.5,3X,'AXIS=',F7.2,3X,'SPHERE=',
              1 F12.5)
                CALL EXIT [211]
                END [212]
/ /     X E Q
                } INSERT DATA CARDS - ONE SET
                  OF COORDINATES PER CARD
/ *
```

From the foregoing description, it should be clear that this invention will admit of a number of modifications. For example, the image can be seen by the patient as in subjective eye testing. Alternatively, the image can be viewed within the patient's eye by the examiner as in objective eye testing.

It should likewise be apparent that virtually any signal generation, electrical or otherwise, responsive to the variable astigmatic and spherical optical functions herein specified can be used. Moreover, the electrical outputs here specified are only exemplary in their resistive, capacitive or inductive outputs. Other outputs, electrical and non-electrical, can be used.

Likewise, the digital program hereshown requires a card input. Computers can be adapted to avoid card inputs in which the keypunch and card input stage can easily be replaced with direct inputs by those skilled in the art.

The programs hereshown are preferred. In the astigmatic prescriptions set forth, they required crossed cylinders with the crossed cylinders of one set being at 45° from the crossed cylinders of the remaining set. Those having skill in the optical art can modify the optics as well as the computer programming so that intervals other than precise 45° between the crossed cylinders can be used.

It should be apparent with the variable astigmatic lenses hereshown that the paired outputs required can be generated from a single lens element as disclosed in my co-pending Patent application Ser. No. 235,134, filed Mar. 3, 1972, and entitled "Variable Astigmatic Lens and Method for Constructing Lens," now U.S. Pat. No. 3,751,138; issued Aug. 7, 1973.

It should also be apparent that the signal generation means here disclosed could be attached to conventional optical equipment. Moreover, if the lenses for generating astigmatism also generate spherical power, modifications can be made in the summing apparatus here disclosed to compensate the change in spherical power generated by change in astigmatic prescription. Likewise, other modifications can be made to this invention without departing from the spirit thereof.

I claim:

1. An eye testing device providing for digital readout of astigmatic lens power and angle comprising: a patient viewing station; an image to be viewed from a preselected location; first means for varying astigmatic lens power to said image, said first means varying said astigmatic power along first and second substantially perpendicular axes normal to a light path from said image; second means for varying the astigmatic lens power to said image, said second means for varying the astigmatic lens power occuring along third and fourth axes normal to the light path from said image, said third and fourth axes being positioned relative to said first and second axes so that first imaginary planes taken through said first and second axes including said light path do not coincide with second imaginary planes taken through said third and fourth axes including said light path; first signal generation means coupled to said first astigmatic lens means for generating a signal proportionate to the astigmatic lens power generated at said first astigmatic lens power means; second signal generation means coupled to said second astigmatic lens means for generating a signal proportionate to the astigmatic lens power generated at said second astigmatic lens means; means for emulating a Cartesian coordinate plot having first and second inputs connected to said first and second signal generation means emulating first and second axes of said Cartesian coordinate plot; output means for emulating a polar coordinate plot operatively connected to said means for emulating a Cartesian coordinate plot, said output means including a first output for resolving the power of the resultant polar coordinate of said polar coordinate plot and second output means for determining the resultant half angle of the resultant polar coordinate plot of said polar coordinate plot.

2. The invention of claim 1 and wherein said first and second means for varying the apparent astigmatic lens power includes a projector, corrective optics intermediate said projector and said patient viewing station, and focusing optics between said corrective optics and said patient viewing station for focusing an apparent image of said corrective optics to a location proximate said patient viewing station.

3. The invention of claim 1 and wherein said first signal generation means operatively connected to one input of said means for emulating a Cartesian coordinate plot includes a sine wave input and said second signal generation means operatively connected to the other input of said means for emulating a Cartesian coordinate plot includes a cosine wave input and said means for emulating a polar coordinate plot includes first output means for resolving the power of said resultant polar coordinate having means for summing the resultant sine and cosine waves of said first and second inputs and said second output means for determining the resultant half-angle of the resultant polar coordinate plot having means for measuring half the plane angle between one and said input waves and said sum of the resultant sine and cosine waves.

4. The invention of claim 1 and wherein said image is viewed from said patient viewing station.

5. The invention of claim 1 and wherein said image is viewed from said eye examination station with said image within the eye of the patient at said patient viewing station.

6. The invention of claim 1 and wherein said first imaginary planes including said light path are separated by 45° angles from said second imaginary planes including said light path.

7. The invention of claim 1 and including third means for varying the spherical power of said image; third signal generation means coupled to said third means for varying the spherical power of said image for generating a signal proportionate to the spherical lens power generated at said third means for generating spherical power; means for weighted summing having at least a first input, a second input and a summed output, said first input operatively connected to said first output for resolving the power of said resultant polar coordinate, said second input operatively connected to said third signal generation means and said summed output of said weighted summer resolving the power of the resultant spherical prescription.

8. An eye testing device including the combination of a patient viewing station, an image to be viewed from a preselected location and means for varying the astigmatic lens power of said image, and means for reading out an astigmatic prescription, the improvement in said varying and readout means comprising: first means for varying the astigmatic lens power to said image, said first means for varying said astigmatic power along first and second substantially perpendicular axes normal to a light path from said image; second means for varying said astigmatic lens power to said image, said second means for varying said astigmatic power occuring along third and fourth axes normal to the light path from said image, said third and fourth axes being positioned relative to said first and second axes so that imaginary planes taken through said first and second axes including said light path do not coincide with secondary imaginary planes taken through said third and fourth axes including said light path; first means coupled to said first astigmatic lens means for generating a signal proportionate to the astigmatic lens power generated at said first astigmatic lens power means; second means coupled to said second astigmatic lens means for generating a signal proportionate to the astigmatic lens power generated at said second astigmatic lens means; means for emulating a Cartesiam coordinate plot having first and second inputs connected to said first and second signal generation means emulating first and second axes of said Cartesian coordinate plot; output means for emulating a polar coordinate plot operatively connected to said means for emulating a Carte-